(12) United States Patent
Suzuki et al.

(10) Patent No.: US 7,372,653 B2
(45) Date of Patent: May 13, 2008

(54) DEGAUSS WAVEFORM GENERATOR FOR PERPENDICULAR RECORDING WRITE HEAD

(75) Inventors: Hiroaki Suzuki, Tokyo (JP); Kenji Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 140 days.

(21) Appl. No.: 11/331,805

(22) Filed: Jan. 13, 2006

(65) Prior Publication Data

US 2006/0158764 A1    Jul. 20, 2006

(30) Foreign Application Priority Data

Jan. 14, 2005    (JP)    .............................. 2005-007659

(51) Int. Cl.
*G11B 5/03*    (2006.01)
(52) U.S. Cl. ............................ 360/66; 360/68; 360/62; 360/46
(58) Field of Classification Search ...................... None
See application file for complete search history.

(56) References Cited

U.S. PATENT DOCUMENTS

| | | | | |
|---|---|---|---|---|
| 4,670,799 A | * | 6/1987 | Ogura et al. | 360/66 |
| 4,821,127 A | * | 4/1989 | Soga et al. | 360/66 |
| 4,970,621 A | * | 11/1990 | Gailbreath et al. | 361/149 |
| 4,970,622 A | | 11/1990 | Büchl | |
| 5,038,230 A | * | 8/1991 | Kusunoki et al. | 360/46 |
| 5,168,395 A | * | 12/1992 | Klaassen et al. | 360/46 |
| 5,307,214 A | * | 4/1994 | Kawakami et al. | 360/61 |
| 5,436,772 A | * | 7/1995 | Sekiya et al. | 360/66 |
| 5,499,156 A | * | 3/1996 | Bentley | 361/150 |
| 6,038,093 A | * | 3/2000 | Takada et al. | 360/66 |
| 7,088,537 B2 | * | 8/2006 | Cronch et al. | 360/66 |
| 7,106,536 B2 | * | 9/2006 | Fang et al. | 360/67 |
| 2005/0190476 A1 | * | 9/2005 | Wilson et al. | 360/46 |

FOREIGN PATENT DOCUMENTS

| | | |
|---|---|---|
| JP | 07-147009 | 6/1995 |
| JP | 07-311922 | 11/1995 |
| JP | 09-007137 | 1/1997 |
| JP | 09-190615 | 7/1997 |

\* cited by examiner

*Primary Examiner*—Hoa T. Nguyen
*Assistant Examiner*—Dismery Mercedes
(74) *Attorney, Agent, or Firm*—Townsend and Townsend and Crew LLP; Rambod Nader

(57) ABSTRACT

Embodiments of the invention provide a hard disk drive that is capable of performing degaussing promptly and properly and a recording method for use with such a hard disk drive. A hard disk drive according to one embodiment of the present invention comprises a current source for supplying a first current, which flows to a write head for writing data onto a magnetic disk; a current source for supplying a second current, which flows to the write head when the polarity of the first current changes; transistors for reversing the polarity of a current flowing to the write head; and a control circuit for exercising control so that the second current I2, which flows from the current source to the write head when the polarity of the first current I1 is reversed, becomes approximately zero before the first current I1 converges to approximately zero during a degauss period.

20 Claims, 8 Drawing Sheets

(a)

(b)

DEGAUSS WAVEFORM GENERATOR FOR PERPENDICULAR RECORDING WRITE HEAD

CROSS-REFERENCES TO RELATED APPLICATIONS

This application claims priority from Japanese Patent Application No. JP2005-007659, filed Jan. 14, 2005, the entire disclosure of which is incorporated herein by reference.

BACKGROUND OF THE INVENTION

The present invention relates to a hard disk drive and recording method, and more particularly to a hard disk drive that degausses a write head and a recording method for use with such a hard disk drive.

Information read/write devices using various types of media such as optical disks and magnetic tapes are known in the art. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of its excellent characteristics. For example, HDDs are used for moving picture read/write devices, car navigation systems, and removable memories for use in digital cameras.

Each magnetic disk used in HDDs has a plurality of tracks formed concentrically and each track is divided into a plurality of sectors. Servo data and user data are stored in each of the sectors. A head element makes access to a desired sector in accordance with the servo data stored in a sector, whereby it is possible to effect write or read of data to or from the magnetic disk.

The head element section usually comprises a write head and a read head. The write head converts an electrical signal or current, which corresponds to the information to be written, into a magnetic field, and writes the information onto the magnetic disk. The write head comprises a magnetic pole piece and windings around the magnetic pole piece. The direction of a current flowing to the write head is changed to change the direction of the magnetic field to be generated. The direction of magnetic disk magnetization varies with the direction of the magnetic field. Consequently, data according to the direction of magnetization is recorded on the magnetic disk. A write current, which is necessary for a write, is determined in accordance with required magnetic field strength and the number of windings around the magnetic pole piece.

If, for instance, the current flowing to the write head is suddenly decreased at the end of a write, the write head is magnetized. When the write head is magnetized, written data may be erased. To prevent the write head from being magnetized, a technology disclosed, for instance, by Patent Document 1 (Japanese Patent Laid-open No. 9-7137) changes a current flowing to the write head to a sinusoidal current and gradually attenuates the amplitude of the current. Another technology disclosed, for instance, by Patent Document 2 (Japanese Patent Laid-open No. 7-311922) performs degaussing by supplying a current flowing to the write head in a waveform other than prescribed in Patent Document 1. These degaussing methods reverse the polarity of a current, that is, reverse the direction of a current flow, while attenuating the current flowing to the write head. These degaussing methods are particularly used for perpendicular magnetic recording.

To increase the write speed, the HDD ensures that a current waveform transition, which occurs when the direction of a write current changes, is provided with an overshoot as indicated in FIG. 6(b). In other words, the direction of a current changes when a change occurs in the data value to be written. When the direction of the current changes, the write current needs to quickly reverse its direction. However, such a direction reverse is delayed by an inductance component of the write head. Consequently, a current change waveform becomes dull. As such being the case, the write current is momentarily increased to provide an overshoot at the time when the direction of the current changes. Subsequently, a predefined level of write current flows. This makes it possible to reduce the rise time (reversal time) between the instant at which the current flowing to the write head reverses and the instant at which the predefined write current level is reached. As indicated in FIG. 6(a), a write current generation circuit 260 for a conventional HDD is provided with an overshoot generation circuit, which comprises a switch 264 and a current source 266 to overshoot the current flowing to a write head 250 when the current reverses. The overshoot generation circuit causes the current source 266 to generate an overshoot current, which corresponds, for instance, to a certain percent of the write current. When the current reverses, the switch 264 turns on so that a current, which is the sum of the write current flowing from a current source 265 and the overshoot current flowing from the current source 266, flows to the write head 250. The current flowing to the write head 250 is supplied from a preamplifier AE circuit (AE: arm electronics), which is mounted inside an enclosure for the HDD. The AE is driven by signals from a hard disk controller (HDC) and read/write channel (R/W channel), which are mounted on a circuit board for controlling the HDD.

In a conventional hard disk drive in which the current flowing to the write head overshoots at the time of reversal in order to reduce the rise time, however, problems occasionally occurred when degaussing was performed after a write. The problems will be described with reference to FIGS. 7 and 8. FIG. 7 is a block diagram illustrating the configuration of an AE in a conventional HDD. FIG. 8 is a timing diagram illustrating signal waveforms that are generated at the time of degaussing.

The configuration of the AE will now be described with reference to FIG. 7. The AE 200 comprises a write current generator 260 and a degauss waveform generator 270. The write current generator 260 generates a current that is to be supplied to a write head 250. The degauss waveform generator 270 generates an attenuation waveform that is suitable for degaussing. In accordance with a signal waveform supplied from the degauss waveform generator 270, the write current generator 260 supplies a current for degaussing to the write head. The write current generator 260 comprises transistors 261a, 261b, 262a, and 262b, switches 263 and 264, and current sources 265 and 266. The transistors 261a and 261b are referred to as transistors 261, whereas the transistors 262a and 262b are referred to as transistors 262.

A normal write period during which a normal write is performed relative to the magnetic disk will now be described. An R/W channel 221, which is mounted on a circuit board 220, enters write data (WED) 211 and 212 into the AE 200. WD 211 and 212 are transmitted as differential signals whose polarities are opposite to each other. Therefore, FIG. 7 shows two write data signal lines. If WD 211 and 212 are not transmitted as differential signals, one signal line will suffice. Write data 211 (+WD) is a signal that is a reversal of write data (−WD) 212. More specifically, when the +WD 211 is High, the −WD 212 is Low. When the +WD 211 is Low, the −WD 212 is High. The direction of the magnetization pattern to be written on the magnetic disk changes in accordance with WD 211 and 212.

Further, an HDC 222, which is mounted on the circuit board 220, enters a write control signal (write gate signal) 213 into the AE 200. The write control signal 213 indicates whether a write is to be performed on the magnetic disk. A write is performed in accordance with the write control signal 213. More specifically, it is defined that when the write control signal 213 is High, a current flows to the write head 250 for performing a write on the magnetic disk. If the write control signal is Low, no write is performed on the magnetic disk. While the write control signal 213 is High, a normal write process is performed. The period during which the write control signal 213 is High is regarded as a normal write period.

The +WD is input to (A) contact of a switch 231. The −WD is input to (A) contact of a switch 232. While the write control signal 213 is High, the switches 231 and 232 select (A) contact. When the switches 231 and 232 select (A) contact, WD 211 and WD 212 from the R/W channel 221 are input to "Base" terminals of the transistors 261 and 262. During a normal write period, therefore, the direction of a current that is generated by the write current generator 260 and flows to the write head changes in accordance with WD 211 and WD 212. In other words, when the +WD 211 is High, the transistor 261 turns on and the transistor 262 turns off. Meanwhile, when the −WD 212 is High, the transistor 261 turns off and the transistor 262 turns on. Thus, a change occurs in the direction of a current that is generated by the write current generator 260 and flows to the write head 250. The following explanation assumes that a "negative" polarity current flows from left to right within the write head 250 when the transistor 261 turns on with the transistor 262 turning off, and that a "positive" polarity current flows right to left within the write head 250 when the transistor 261 turns off with the transistor 262 turning on. The current flowing to the write head 250 is supplied from the current sources 265 and 266 via the switches 263 and 264, which are provided in the write current generator 260.

The current source 265 supplies a write current for performing a write on the magnetic disk. For explanation purposes, it is assumed that the write current is 50 mA. More specifically, data may be written onto the magnetic disk when a current of +50 mA or −50 mA flows to the write head. During the normal write period, the current I1 supplied from the current source 265 is fixed at 50 mA. On the other hand, the current source 266 supplies an overshoot current. In other words, the current from the current source 266 flows to the write head 250 only when a change occurs in the direction of the current flowing to the write head. The switch 263 is provided between the current source 265 and the write head 250. The switch 264 is provided between the current source 266 and the write head 250. The switch 263 controls the current supply from the current source 265. The switch 264 controls the current supply from the current source 266.

The switch 263, which is connected to the current source 265, is controlled in accordance with the write control signal 213. In reality, however, the switch 263 is controlled in accordance with a superimposed signal 247, which is generated when a superimposition circuit 240 superimposes a degauss enable signal 271 over the write control signal 213. This control operation will be described later. During the normal write period, the write control signal 213 is High so that the switch 263 is on. In this instance, the current source 265 supplies a current to the write head 250.

The switch 264, which is connected to the current source 266, is controlled in accordance with an output that is generated by a single shot (S/S) 241. During the normal write period, the switches 231 and 232 select (A) contact. Therefore, the +WD 211 and −WD 212 are input to the single shot (S/S) 241. The single shot (S/S) 241 detects a rise of the +WD 211 or −WD 212. The output of the single shot (S/S) 241 becomes a signal that exhibits a pulse when a change occurs in the direction of the current flowing to the write head 250. Therefore, the switch 264 turns on when WD 211 and WD 212 rise. In other words, when a change occurs in the direction of the current flowing to the write head, the switch 264 turns on and a current flows from the current source 266 to the write head 250. For explanation purposes, it is assumed that the current source 266 supplies 20% of the current supplied from the current source 265. During the normal write period, the current supplied from the current source 266 is 10 mA.

When the overshoot current source 266 is used as described above, it is possible to reduce the rise time between the instant at which the +WD/−WD data value changes and the instant at which a preselected write current of 50 mA is reached. During the normal write period, the write current attempts to flow in a reverse direction in order to reach a peak current of 60 mA when the polarity reverses. Therefore, the time required to reach a current of 50 mA is rendered shorter, and then an overshoot occurs so that a current of 60 mA is reached. However, a current of 50 mA is soon restored.

A degauss period during which degaussing is performed will now be described. The AE 200 incorporates the degauss waveform generator 270 in order to generate a degauss current waveform.

The write control signal 213 enters the degauss waveform generator 270. The degauss waveform generator 270 generates the degauss enable signal 271 in accordance with the write control signal 213. More specifically, the degauss enable signal 271 is output when the write control signal 213 turns off, that is, when the normal write period terminates, allowing a write process to be followed by a read process. The degauss enable signal 271 has a pulse waveform that is High during the time corresponding to the degauss period during which degaussing is performed. When the degauss enable signal 271 is High, a degaussing operation is performed. When the degauss enable signal 271 is Low, no degaussing operation is performed. The degauss enable signal 271 remains High for a certain period of time after the end of the normal write period, and then reverts to Low. When the degaussing operation starts, the R/W channel 221 stops supplying WD 211 and WE 212.

The degauss waveform generator 270 incorporates an oscillator clock or constant frequency generator. The oscillator clock or the like is used to generate degauss write data 272 and 273. Degauss write data 272 is referred to as the +DWD. Degauss write data 273 is referred to as the −DWD. Degauss write data 272 and 273 are referred to as the DWD. As shown in FIG. 8, DWD 272 and 273 are pulse waveforms having a predetermined frequency and a predetermined pulse width. As indicated in FIG. 8, these pulse waveforms appear during the degauss period only. The +DWD 272 is a reversal of the −DWD 273. More specifically, when the +DWD 272 is High, the degauss write data 273 is Low.

When the +DWD 272 is Low, the degauss write data 273 is High. The +DWD and −DWD are half a cycle out of phase and equal in pulse width.

The +DWD 272 is input to a (B) contact of the switch 231. The degauss write data 273 is input to a (B) contact of the switch 232. During the degauss period, the switches 231 and 232 have a (B) contact. Therefore, DWD 272 and 273 are input to the "Base" terminals of the transistors 261 and 262, respectively. A change occurs in the direction of the current flowing to the write head 250 in accordance with DWD 272 and 273. When the +DWD 272 is High, the transistor 261 turns on so that a current flows from left to right within the write head 250. In other words, a "negative" sign write current flows to the write head 250. When the −DWD 273 is High, the transistor 262 turns on so that a current flows from right to left within the write head 250. In other words, a "positive" sign write current flows to the write head 250. In this manner, it is possible to change the direction of the current flowing to the write head during the degauss period. During the degauss period, the polarity of the current flowing to the write head 250 reverses at fixed time intervals.

The switches 231 and 232 change in accordance with the degauss enable signal 271. More specifically, when the degauss enable signal 271 goes High, a (A) contact is superseded by (B) contact. While the degauss enable signal 271 is High, the switches 231 and 232 select a (B) contact. When the degauss enable signal 271 goes Low, the switches 231 and 232 revert to (A) contact. The switches 231 and 232 are connected to a (A) contact while the write control signal 213 is High to represent a write period. The signal input to the base terminals of the transistors 261 and 262 in the write current generator 260 changes depending on whether the normal write period or degauss period prevails.

During the degauss period, the switch 263 is controlled in accordance with the degauss enable signal 271. When the degauss enable signal 271 is High, the switch 263 turns on. Therefore, the switch 263 is on during the degauss period. Consequently, the current supplied from the current source 265 constantly flows to the write head 250 during the degauss period as well.

The switch 263 turns on/off in accordance with the write control signal 213 and degauss enable signal 271. The state of the switch 263 changes in accordance with the superimposed signal 247, which is obtained when the superimposition circuit 240 superimposes the degauss enable signal 271 over the write control signal 213. The superimposed signal 247 is obtained by extending the write control signal 213 for the degauss period. When the superimposed signal 247 is High, that is, when the write control signal 213 or degauss enable signal 271 is High, the switch 263 is on. The switch 263 remains on during the time interval between the instant at which the normal write period begins and the instant at which the degauss period ends. This ensures that the current supplied from the current source 265 flows to the write head 250 during the normal write period and during the degauss period.

The state of the switch 264 changes in accordance with an output that is generated by the single shot (S/S) 241. During the degauss period, the switches 231 and 232 have a (B) contact so that DWD 272 and 273 enter the single shot (S/S) 241. The single shot (S/S) 241 detects a rise in DWD 272 and 273. In other words, the output of the single shot (S/S) 241 becomes a signal that exhibits a pulse when a change occurs in the direction of the current flowing to the write head 250. The +DWD 272 and −DWD 273 have the same pulse width. The +DWD 272 is a signal that is a reversal of the −DWD 273. Therefore, the output of the single shot (S/S) 241 is a pulse waveform that has two times the frequency of DWD 272/DWD 273 as indicated in FIG. 8. The switch 264 turns on when DWD 272 and DWD 273 rise. More specifically, when a change occurs in the direction of the current flowing to the write head 250, the switch 264 turns on so that a current flows from the current source 266 to the write head 250. The current source 266 supplies 20% of the current supplied from the current source 265.

As described above, the state of the switch 264 changes in accordance with the output of the single shot (S/S) 241. WD 211 and WD 212 or the +DWD 272 and −DWD 273 enter the single shot (S/S) 241. The signal input to the single shot (S/S) 241 changes depending on whether the switches 231 and 232 select a (A) contact or a (B) contact. More specifically, when the switch 231 has a (A) contact, WD 211 and WD 212 enter the single shot (S/S) 241. On the other hand, when the switch 231 has a (B) contact, the +DWD 272 and −DWD 273 enter the single shot (S/S) 241. In other words, the signals entering the single shot (S/S) 241 are the same as the signals entering the transistors 261 and 262. The single shot (S/S) 241 extracts a rise of the two input signals. The overshoot current flows when a change occurs in the direction of the current flowing to the write head. Therefore, the switch 264 turns on when the on/off states of the transistors 261 and 262 change. More specifically, the switch 264 turns on when the transistor 261 changes from the "on" state to the "off" state and the transistor 262 changes from the "off" state to the "on" state or vice versa. This ensures that the switch 264 turns on when a change occurs in the polarity of the current flowing from the current source 265 to the write head 250. Consequently, when the polarity of the current flowing to the write head 250 reverses, the current supplied from the current source 266 flows to the write head 250.

During the degauss period, the switch 263 remains on as is the case with the normal write period. The switch 263 is controlled by the superimposed signal 247. Therefore, the switch 263 remains on during the normal write period and degauss period. During the degauss period, the switch 264 temporarily turns on the moment a change occurs in the direction of the current flowing to the write head 250 as is the case with the normal write period. Consequently, the current supplied from the current source 266 and the current supplied from the current source 265 both flow to the write head 250. In other words, when the polarity of the current flowing to the write head 250 reverses during the degauss period, the switch 264 turns on so that the current supplied from the current source 266 flows to the write head 250.

The magnitudes of the currents supplied from the current sources 265 and 266 will now be described. As shown in FIG. 7, the degauss waveform generator 270 generates digital data (DAC values) 274 and 275, which are to be supplied to the current sources 265 and 266. For setting the currents for current sources 265 and 266, digital data (DAC values) 274 and 275 are subjected to digital-to-analog conversion and then delivered to the current sources 265 and 266. In accordance with digital data (DAC values) 274 and 275, the current sources 265 and 266 set the magnitudes of the currents to be supplied. More specifically, the current source 265 determines the magnitude of its supply current in accordance with digital data 274, whereas the current source 266 determines the magnitude of its supply current in accordance with digital data 275. The magnitude of the current supplied from the current source 265 increases with an increase in digital data 274, and the magnitude of the current supplied from the current source 266 increases with an increase in digital data 275. The current source 265 flows a necessary write current during the normal write period so that the write head 250 may perform a write. On the other hand, the current source 266 flows an overshoot current during the normal write period so as to reduce the time required for reversing the direction of the write current.

During the normal write period, digital data 274 and 275 usually remains constant. It means that the current supplied from the current sources 265 and 266 are constant during the normal write period. During the degauss period, however, digital data (DAC values) 274 and 275 gradually decrease from a level prevailing during the normal write period. In other words, digital data 274 is maximized during the normal write period and gradually decreased during the degauss period. Therefore, the current I1 supplied from the current source 265 is maximized during the normal write period and gradually decreased during the degauss period. Since the current I2 supplied from the current source 266 is 20% of the current supplied from the current source 265, digital data 275 is also maximized during the normal write period and gradually decreased during the degauss period. Therefore, the current I2 supplied from the current source 265 attenuates at the same rate as the current I1 supplied from the current source 265.

It is assumed that the write current is 50 mA as indicated in FIG. 8. During the normal write period, a maximum current of 60 mA (a write current of 50 mA plus an overshoot current of 10 mA) flows to the write head as a peak current. In other words, a current of 60 mA flows to the write head 250 when a change occurs in the polarity of the current flowing to the write head 250. The following explanation assumes that the current flowing to the write head decreases in steps of 5 mA from a write current level of 50 mA during the degauss period.

As indicated in FIG. 8, the current I1 supplied from the current source 265 decreases in steps of 5 mA from a level of 50 mA (decreases to 45 mA, 40 mA, and so on to 0 mA) during the degauss period. Digital data 274 is decreased so that the current decreases in steps of 5 mA when the +DWD or −DWD rises. In this instance, the polarity of the current reverses. In other words, the current decreases in steps of 5 mA each time a change occurs in the polarity of the current flowing to the write head 250. Therefore, the current flowing from the current source 265 to the write head 250 attenuates from 50 mA to 0 mA while changing the polarity (decreases from 50 mA to 0 −45 mA, +40 mA, −35 mA, and so on to 0 mA).

During the degauss period, the current I2 supplied from the current source 266 also decreases in the same manner as described above. Setup is performed so that the current I2 supplied from the current source 266 is 20% of the current I1 supplied from the current source 265. Therefore, the current I2 supplied from the current source 266 gradually decreases in steps of 1 mA from 10 mA to 9 mA, 8 mA, and so on to 0 mA. Consequently, the current flowing from the current source 266 to the write head 250 attenuates while changing the polarity (decreases to −9 mA, +8 mA, −7 mA, and so on to 0 mA). At the beginning of the degauss period (before the initial rise of the +DWD or −DWD), the polarity of the current flowing from the current source 265 to the write head is not reversed. Since the write current is still not reversed, the switch 264 is off. Therefore, the current flowing from the current source 266 to the write head 250 is 0 mA. The total current generated by the write current generator 260 is 50 mA including the current flowing from the current source 265 to the write head 250. The overshoot current is added to the flowing current at the moment the polarity indicating the direction of the write current reverses.

Thus, the switch 264 turns on. The current flowing to the write head 250 is increased by the amount of the overshoot current. Therefore, when the overshoot current is taken into account, the current flowing to the write head during the degauss period attenuates to 50 mA, −54 mA, 48 mA, −42 mA, and so on to 0 mA as shown in FIG. 8.

BRIEF SUMMARY OF THE INVENTION

As described above, the conventional hard disk drive reduces the time required for reversing the write current during the normal write period. Therefore, the current source 266, which remains on only during the reversal time to generate an overshoot waveform, allows a reversed write current to overshoot. In this instance, the overshoot generation circuit is operated in the same manner during the degauss period during which the write head is degaussed. Therefore, the resulting degauss current waveform has a peak current that is higher than the write current for attenuation by the overshoot current. However, many high-frequency components, which constitute a peak current waveform, are likely to vary under the influence of write head inductance and parasitic capacitance. Consequently, degaussing cannot be performed promptly and properly due to a disordered degauss current waveform, which causes the actual peak current to change. The current does not smoothly attenuate to zero in the end particularly if a peak current remains in the degauss current waveform at an end stage of the degauss period, that is, after degauss current waveform reversal is sufficiently repeated. In the above example, it is assumed that the overshoot current is 20% of the normal write current. However, if the reversal speed is low, setup may be performed so that the overshoot current is 50% or 100% of the normal write current. If such setup is directly applied to the degauss current waveform, the current cannot smoothly attenuate to zero. In the conventional HDD, the overshoot current is supplied upon write current direction reversal during the degauss period. As a result, degaussing cannot properly be performed in the conventional HDD.

The present invention has been made in view of the above circumstances. The present invention provide a hard disk drive that is capable of performing degaussing promptly and properly and a recording method for use with such a hard disk drive.

According to a first aspect of the present invention, there is provided a hard disk drive, which includes a magnetic recording medium and a write head for writing data onto the magnetic recording medium, wherein the polarity of a current flowing to the write head is reversed in accordance with the data to write the data onto the magnetic recording medium. The hard disk drive comprises: a first current source for supplying a first current, which flows to the write head, in order to write the data onto the magnetic recording medium; a second current source for supplying a second current, which flows to the write head, when the polarity of the first current changes; a switching circuit for reversing the polarities of currents flowing from the first and second current sources to the write head; and a control circuit for exercising control after the data is completely written so that the second current, which flows from the second current source to the write head when the polarity of the first current is reversed, becomes approximately zero before the first current converges to approximately zero during a degauss period during which the write head is degaussed by flowing the first current to the write head with the polarity of the first current reversed while the first current is attenuated. Consequently, the hard disk drive according to the first aspect of the present invention may degauss the write head promptly and properly.

According to a second aspect of the present invention, there is provided the hard disk drive as described above, wherein the control circuit stops the second current, which flows from the second current source to the write head, during the degauss period. Consequently, the hard disk drive according to the second aspect of the present invention may degauss the write head promptly and properly.

According to a third aspect of the present invention, there is provided the hard disk drive as described above, wherein the control circuit includes a switch that is positioned between the write head and the second current source; and wherein the switch stops the second current, which flows from the second current source to the write head. Consequently, the hard disk drive according to the third aspect of the present invention may degauss the write head promptly and properly although a simple configuration is employed.

According to a fourth aspect of the present invention, there is provided the hard disk drive as described above, wherein the control circuit further includes an AND circuit into which a write control signal for indicating a period for writing the data and the write data for reversing the polarity of a first current, which flows from the first current source, are input; and wherein the switch is controlled in accordance with an output from the AND circuit. Consequently, the hard disk drive according to the fourth aspect of the present invention may degauss the write head promptly and properly although a simple configuration is employed.

According to a fifth aspect of the present invention, there is provided the hard disk drive as described above, wherein the second current, which flows from the second current source to the write head, is stopped by reducing the second current, which is output from the second current source, to approximately zero. Consequently, the hard disk drive according to the fifth aspect of the present invention may degauss the write head promptly and properly although a simple configuration is employed.

According to a sixth aspect of the present invention, there is provided the hard disk drive as described above, wherein the control circuit stops the second current, which flows to the write head, by exercising control to reduce the second current, which is output from the second current source, to approximately zero. Consequently, the hard disk drive according to the sixth aspect of the present invention may degauss the write head promptly and properly although a simple configuration is employed.

According to a seventh aspect of the present invention, there is provided the hard disk drive as described above, wherein the control circuit reverses the polarity of the second current while attenuating the second current to approximately zero during a second attenuation period, which is shorter than a first attenuation period during which the first current converges to approximately zero. Consequently, the hard disk drive according to the seventh aspect of the present invention may degauss the write head promptly and properly although a simple configuration is employed.

According to an eighth aspect of the present invention, there is provided the hard disk drive as described above, further comprising a register for setting a current value for the second current, which is supplied from the second current source, wherein, during the degauss period, the second current attenuates to approximately zero within the second attenuation period in accordance with a register value that is stored in the register. Consequently, the hard disk drive according to the eighth aspect of the present invention may steadily perform degaussing.

According to a ninth aspect of the present invention, there is provided the hard disk drive as described above, wherein the register value is variable. Consequently, the hard disk drive according to the ninth aspect of the present invention may generate a preferred degauss current waveform with ease.

According to a tenth aspect of the present invention, there is provided a recording method for a hard disk drive, which includes a magnetic recording medium and a write head for writing data onto the magnetic recording medium, wherein the polarity of a current flowing to the write head is reversed in accordance with the data to write the data onto the magnetic recording medium. The recording method comprises the steps of: flowing a first current, which is supplied from a first current source, to the write head; reversing the polarity of the first current, which flows to the write head, in accordance with the data; flowing, when the polarity of the first current is reversed, the first current and a second current, which is supplied from a second current source, to the write head; performing, after completion of a write onto the magnetic recording medium, degaussing with the polarity of the first current reversed while attenuating the first current, which flows from the first current source to the write head; and reducing the second current, which flows from the second current source to the write head when the polarity of the first current is reversed, to approximately zero before the first current converges to approximately zero within a degauss period during which the degaussing is performed. Consequently, the recording method according to the tenth aspect of the present invention makes it possible to degauss the write head promptly and properly.

According to an eleventh aspect of the present invention, there is provided the hard disk drive as described above, wherein the second current, which flows from the second current source, is stopped during the degauss period. Consequently, the hard disk drive according to the eleventh aspect of the present invention may degauss the write head promptly and properly.

According to a twelfth aspect of the present invention, there is provided the recording method as described above, wherein a current flowing from the second current source to the write head is stopped by turning off a switch that is provided between the second current source and the write head. Consequently, the hard disk drive according to the twelfth aspect of the present invention may degauss the write head promptly and properly although a simple configuration is employed.

According to a thirteenth aspect of the present invention, there is provided the recording method as described above, wherein the polarity of the second current is reversed while attenuating the second current to approximately zero during a second attenuation period, which is shorter than a first attenuation period during which the first current converges to approximately zero.

According to a fourteenth aspect of the present invention, there is provided the recording method as described above, wherein the second current attenuates to approximately zero within the second attenuation period in accordance with a register value that is stored in a register for setting a current value for the second current, which is supplied from the second current source. Consequently, the hard disk drive according to the fourteenth aspect of the present invention may steadily perform degaussing.

The present invention provides a hard disk drive that is capable of performing degaussing promptly and properly.

DETAILED DESCRIPTION OF THE INVENTION

Figure 1:
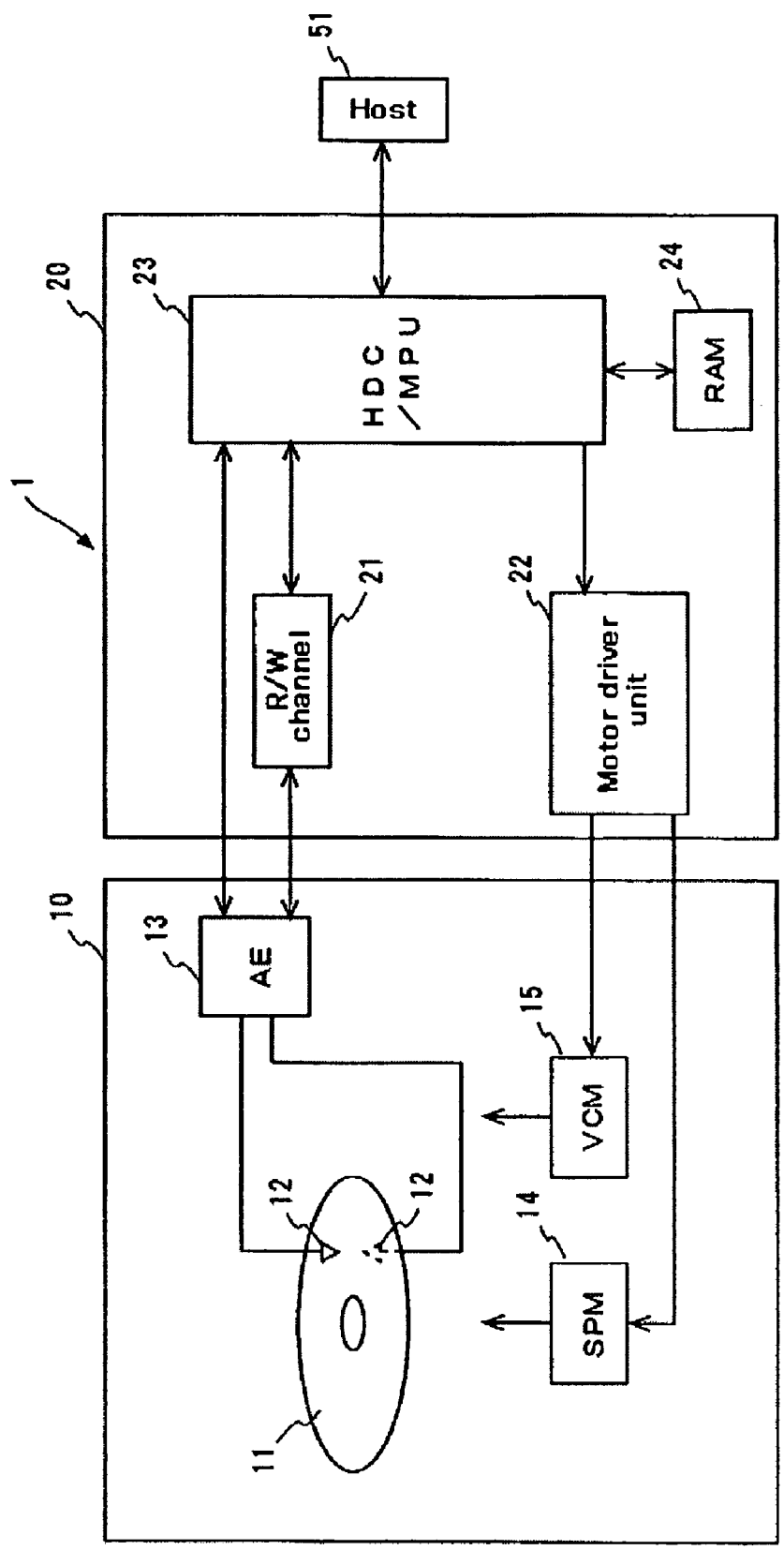
FIG. 1 is a block diagram that schematically illustrates the configuration of an HDD according to one embodiment of the present invention.

Specific embodiments of the present invention are described below. For the sake of clarity in explanation, the following descriptions and accompanying drawings are abbreviated or simplified as appropriate. Persons of skill in the art will appreciate that changes, additions, and variations may be applied without departure from the scope and spirit of the present invention. Like elements in the drawings are denoted by like reference numerals and will not be described repeatedly for the sake of clarity.

First Embodiment

A first embodiment of the present invention will now be described in detail with reference to the accompanying drawings. For ease of understanding of the present invention, the overall configuration of a hard disk drive (HDD), which is an example of a recording media drive, will be first outlined. FIG. 1 is a block diagram that schematically shows the configuration of an HDD 1 according to the present embodiment. The HDD 1 comprises a magnetic disk 11, which is a typical recording medium, a head element section 12, which is a typical head, an arm electronic circuit (arm electronics or AE) 13, a spindle motor (SPM) 14, and a voice coil motor (VCM) 15. These components are positioned within a hermetically sealed enclosure 10.

The HDD 1 includes a circuit board 20, which is fastened to the outer surface of the enclosure 10. Mounted on the circuit board 20 are a read/write channel (R/W channel) 21, a motor driver unit 22, an integrated circuit incorporating a hard disk controller (HDC) and an MPU (this integrated circuit is hereinafter referred to as the HDC/MPU) 23, a RAM 24, which is a typical memory, and other ICs. The circuit components may be integrated into a single IC or mounted separately in a plurality of ICs.

The HDC/MPU 23 receives write data from an external host 51. The head element section 12 writes the received write data onto the magnetic disk 11 via the R/W channel 21 and AE 13. Data stored on the magnetic disk 11 is read by the head element section 12. The HDC/MPU 23 then outputs the read data to the external host 51 via the AE 13 and R/W channel 21.

Figure 2:
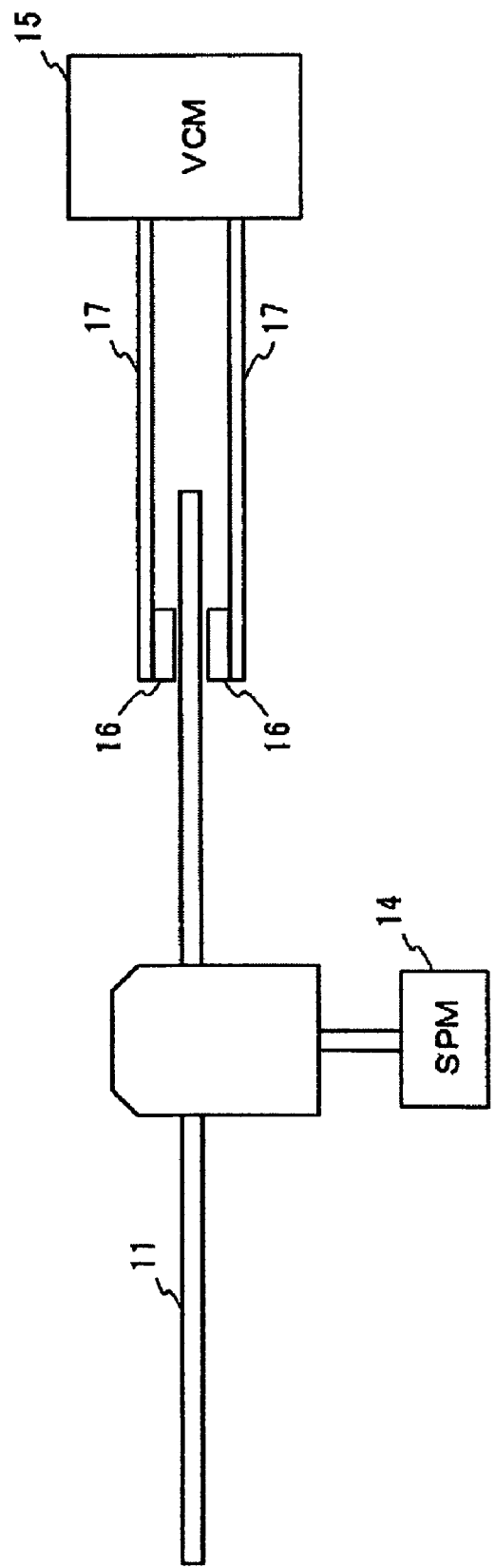
FIG. 2 is a block diagram that schematically illustrates the configuration of an HDD according to one embodiment of the present invention.

The components of the HDD 1 will now be described. First of all, the drive mechanism for the magnetic disk 11 and head element section 12 will be summarized with reference to FIG. 2. The magnetic disk 11 is fastened to a hub of the SPM 14. The SPM 14 rotates the magnetic disk 11 at a predetermined speed. In accordance with control data that is supplied from the HDC/MPU 23, the motor driver unit 22 drives the SPM 14. The magnetic disk 11 according to the present embodiment has a data recording surface on both sides. Head element sections 12 (not shown in FIG. 2) are provided to handle both recording surfaces.

Each head element section 12 is fastened to a slider 16. The slider 16 is fastened to a carriage 17. The carriage 17 is fastened to the VCM 15. The VCM 15 oscillates to move the slider 16 and head element section 12. The motor driver unit 22 drives the VCM 15 in accordance with the control data supplied from the HDC/MPU 23.

To read data from or write data onto the magnetic disk 11, the carriage 17 moves the slider 16 and head element section 12 to a location over a data area on a surface of the magnetic disk 11. When the carriage 17 oscillates, the slider 16 and head element section 12 radially move over the surface of the magnetic disk 11. In this manner, the head element section 12 accesses a desired area.

The pressure invoked by the viscosity of the air between the ABS (air bearing surface) of the slider 16, which faces the magnetic disk 11, and the rotating magnetic disk 11 balances with a force that is applied toward the magnetic disk 11 by the carriage 17. Consequently, the head element section 12, which is fastened to the slider 16, flies above the magnetic disk 11, providing a certain clearance to the magnetic disk surface. Typically, the head element section 12 has a one-piece read/write head, which includes a write head for converting an electrical signal to a magnetic field in accordance with data stored on the magnetic disk 11 and a read head for converting a magnetic field, which is generated from the magnetic disk 11, to an electrical signal. There should be at least one magnetic disk 11. A recording surface may be formed on either or both sides of the magnetic disk 11.

Returning to FIG. 1, each circuit section will now be described. The AE 13 selects one head element section 12 from a plurality of head element sections 12 for the purpose of accessing data, amplifies (with a preamplifier) at a certain gain the read signal read by the selected head element section 12, and forwards the amplified read signal to the R/W channel 21. Further, the write signal output from the R/W channel 21 is delivered to the selected head element section 12. The AE 13 exercises distinctive control during a degaussing process as described later.

The R/W channel 21 performs a write process on data that is transferred from the host 51. In the write process, the R/W channel 21 receives write data from the HDC/MPU 23, and subjects the write data to code modulation. The AE 13 receives the write data, which is code-modulated by the R/W channel 21, converts the received write data to a write signal (electrical current), and supplies the write signal to the write head, which composes the head element section 12. When data is to be supplied to the host 51, the R/W channel 21 performs a read process. In the read process, the AE 13 receives a read signal from the read head, which composes the head element section 12, and amplifies the received read signal to a read signal having a certain amplitude. The R/W channel 21 extracts data from the obtained read signal and performs a decoding process on the extracted data. The data to be read contains user data and servo data. The decoded read data is supplied to the HDC/MPU 23.

The HDC/MPU 23 is a circuit within which the MPU and HDC are integrated into a single chip. The MPU operates in accordance with microcode that is loaded into the RAM 24. When the HDD 1 starts up, the magnetic disk 11 or ROM (not shown) loads the data required for control and data processing into the RAM 24 in addition to the microcode for MPU operation. The HDC/MPU 23 performs necessary processes for head element section positioning control, interface control, defect management, and various other data processing operations, and exercises overall control over the HDD 1.

The HDC/MPU 23 is capable of interfacing with the host 51, and receives user data, read command, write command, and other commands from the host 51. The HDC/MPU 23 transfers the received user data to the R/W channel 21. Further, the HDC/MPU 23 transmits read data, which is acquired from the magnetic disk via the R/W channel 21, to the host 51. In addition, the HDC/MPU 23 performs an error correction (ECC) process on user data that is obtained from the host 51 or read from the magnetic disk 11. The HDD 1 according to the present embodiment transmits data (commands, user data, and control data included) to and receives the data from the host 51 via a serial or parallel communications link.

The data to be read by the R/W channel 21 includes user data and servo data. The HDC/MPU 23 uses the servo data to exercise positioning control over the head element section 12. The control data supplied from the HDC/MPU 23 is output to the motor driver unit 22. The motor driver unit 22 supplies a drive current to the VCM 15 in accordance with a control signal. Further, the HDC/MPU 23 uses the servo data to control a data read/write process.

Figure 3:
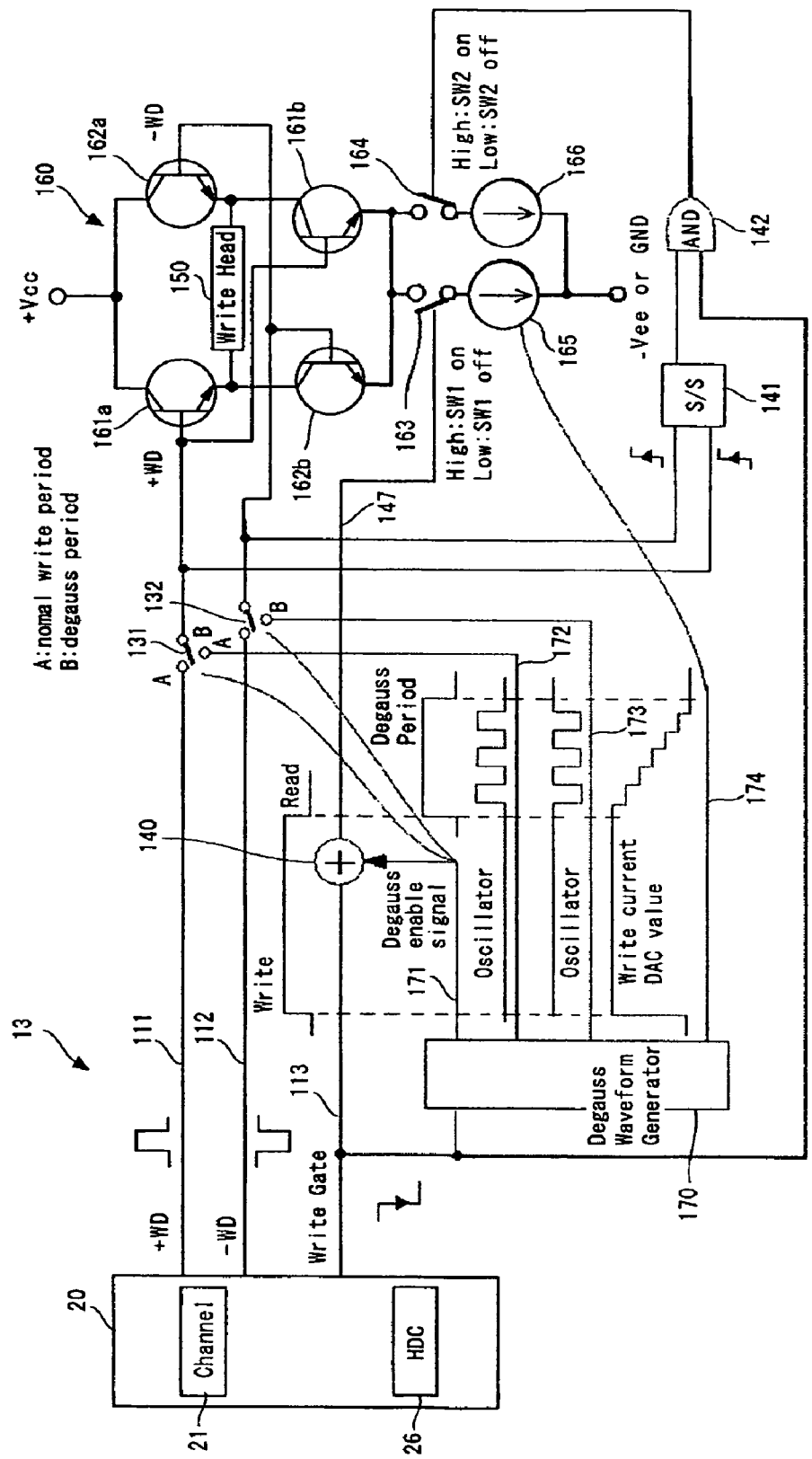
FIG. 3 schematically illustrates the configuration of an AE in an HDD according to one embodiment of the present invention.
Figure 4:
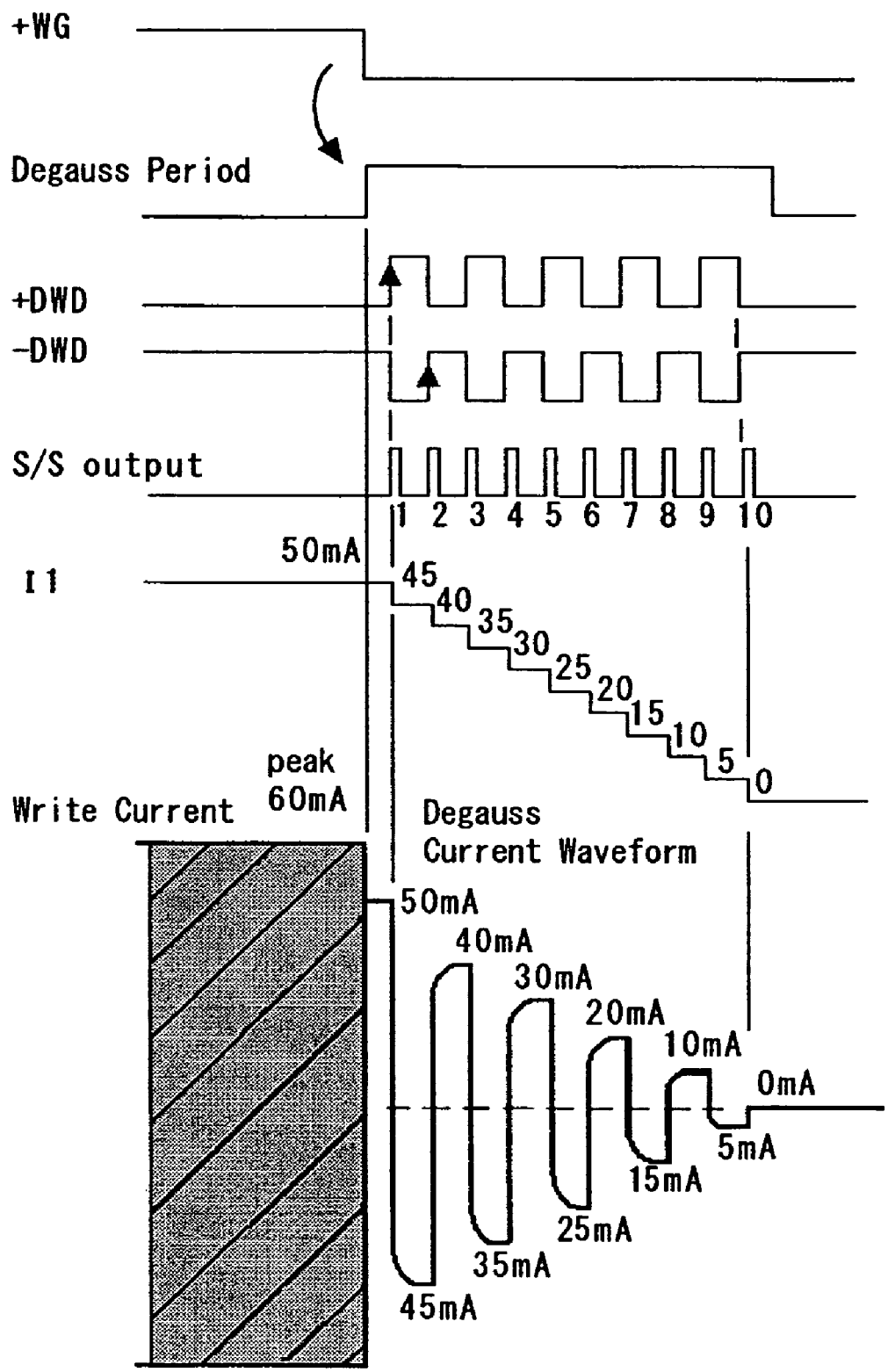
FIG. 4 is a timing diagram that illustrates a degaussing process that is performed by an HDD according to one embodiment of the present invention.

The configuration for performing a degaussing process in the HDD will now be described with reference to FIGS. 3 and 4. FIG. 3 shows the configuration of the AE in the HDD. FIG. 4 is a timing diagram illustrating signal waveforms for degaussing. An example in which the AE 13 controls a degaussing process will be described in accordance with the present embodiment.

Figure 6:
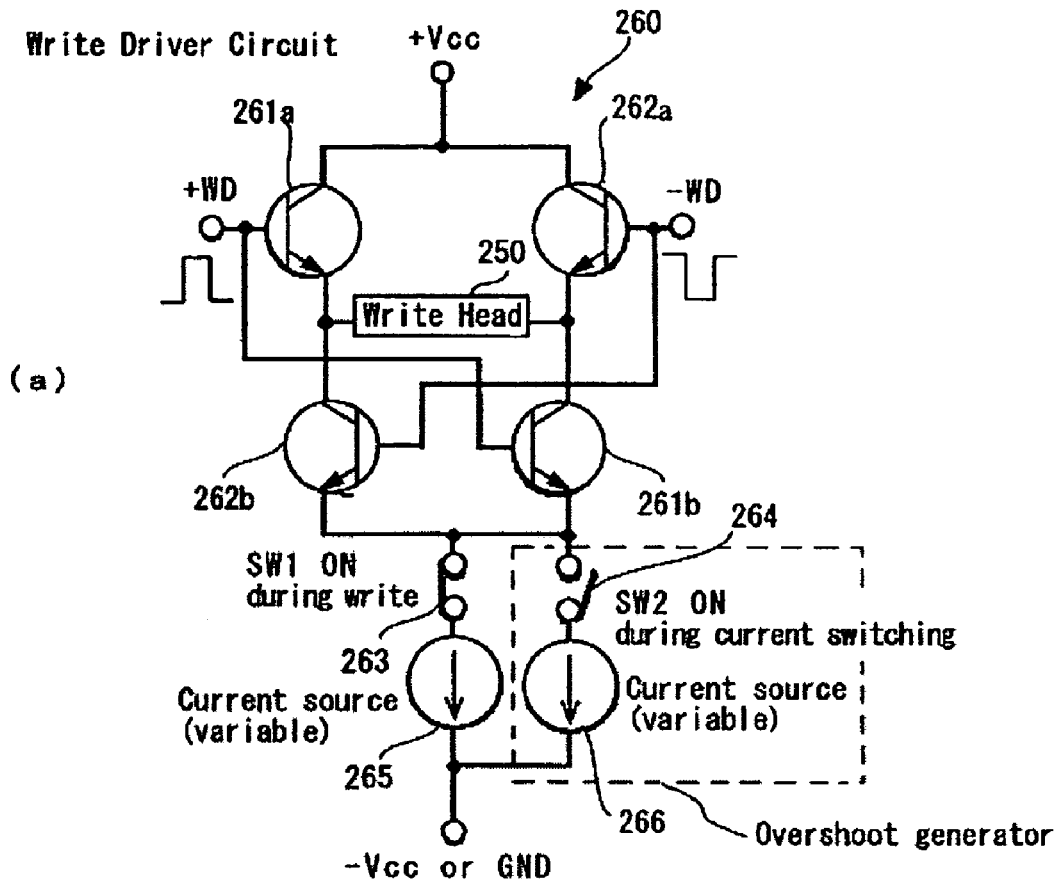
FIG. 6(a) illustrates the configuration of a write current generator for generating a write current that flows to a write head of an HDD.
FIG. 6(b) illustrates a write current that prevails during a normal write period.
Figure 6:
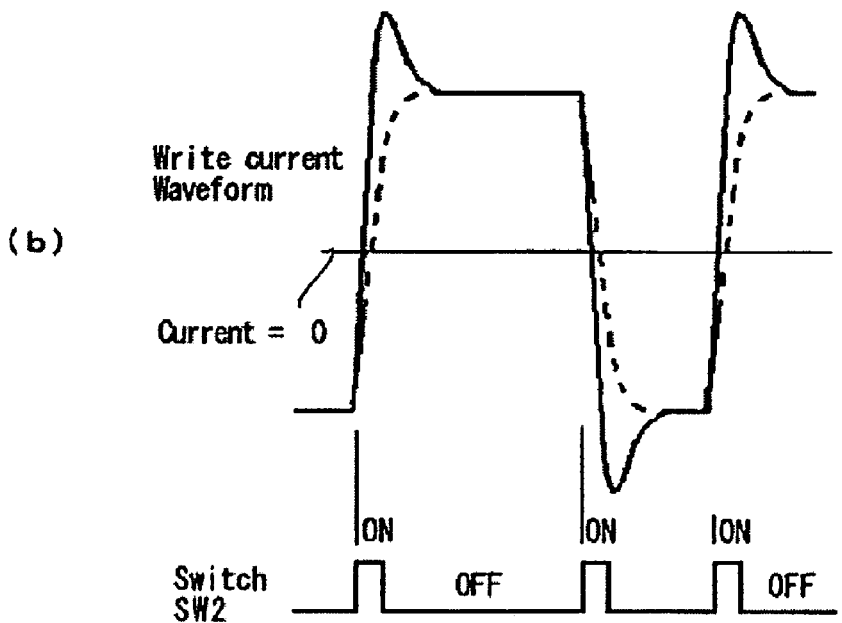
Figure 7:
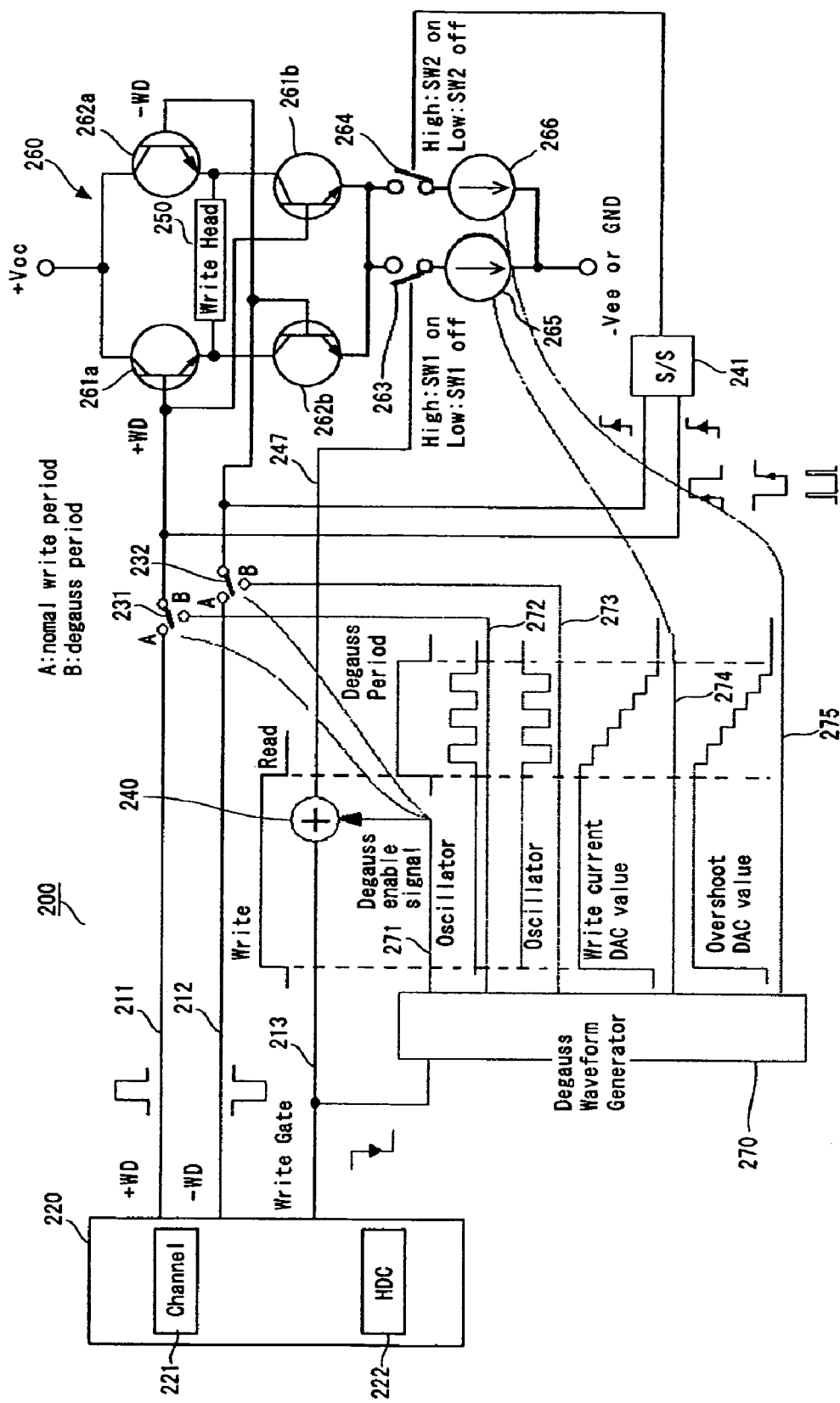
FIG. 7 schematically illustrates the configuration of an AE in a conventional HDD.
Figure 8:
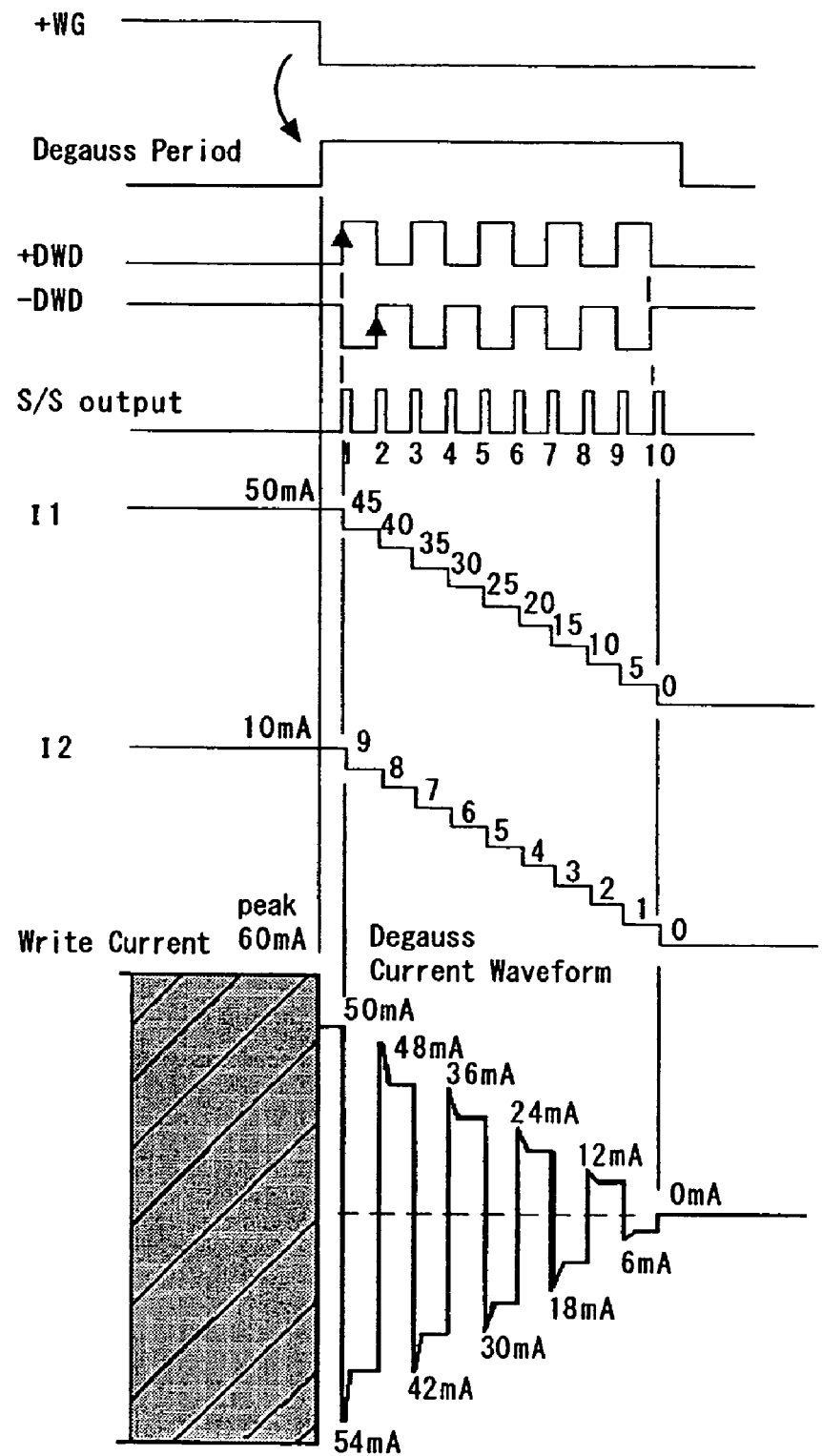
FIG. 8 is a timing diagram that illustrates a degaussing process that is performed by a conventional HDD.

First of all, the configuration of the AE 13 for use in the HDD according to the present invention will be described with reference to FIG. 3. As shown in FIG. 3, the AE 13 comprises a write current generator 160, a degauss waveform generator 170, a single shot (S/S) 141, and an AND (logical product) circuit 142. The write current generator 160 comprises transistors 161a, 161b, 162a, 162b, switches 163, 164, and current sources 165, 166. The basic configuration of the write current generator 160 is the same as that of the write current generator 260 in a conventional HDD, which is shown in FIGS. 6(a) and 6(b). The transistors 161a and 161b are referred to as transistors 161, whereas the transistors 162a and 162b are referred to as transistors 162. During a normal write period and in accordance with a signal supplied from the R/W channel 21 and a signal supplied from an HDC 26, which is a part of the HDC/MPU 23, the write current generator 160 generates a write current that is to be supplied to a write head 150. During a degauss period and in accordance with signals supplied from the degauss waveform generator 170 and AND (logical product) circuit 142, the write current generator 160 generates a write current that is to be supplied to the write head 150. The degauss waveform generator 170 generates a degauss enable signal 171, degauss write data DWD 172, 173, and digital data (DAC value) 174 in accordance with a write control signal (write gate signal) 113 that is supplied from the HDC 26.

First of all, the normal write period during which a normal write is performed relative to the magnetic disk will be described. The R/W channel 21, which is mounted on the circuit board 20, enters write data (WD) 111, 112 into the AE 13. FIG. 3 shows two write data signal lines because WD 111 and 112 are transmitted as differential signals. Write data 111 (+WD) is a signal that is a reversal of write data 112 (−WD). More specifically, when the +WD 111 is High, the −WD 112 is Low. When the +WD 111 is Low, the −WD 112 is High. The data to be written onto the magnetic disk varies in accordance with WD 111 and 112.

Further, the HDC 26, which is mounted on the circuit board 20, enters the write control signal 113 into the AE 13. The write control signal 113 indicates whether a write is to be performed relative to the magnetic disk. A write is performed in accordance with the write control signal 113. More specifically, when the write control signal 113 is High, a current flows to the write head 150 so that a write is performed relative to the magnetic disk. When, on the other hand, the write control signal is Low, no write is performed relative to the magnetic disk. As described above, a normal write process is performed while the write control signal 113 is High. The normal write period is a period during which the write control signal 113 is High.

The +WD is input to a (A) contact of a switch 131. The −WD is input to a (A) contact of a switch 132. The switches 131 and 132 select (A) contact during the normal write period during which the write control signal 113 is High. State changes in the switches 131 and 132 are controlled by the degauss enable signal 171 as described later. The output of the switch 131 is input to a base terminal of the transistor 161. The output of the switch 132 is input to a base terminal of the transistor 162. Therefore, the signals input to the base terminals of the transistors 161 and 162 when the switches 131 and 132 select (A) contact are WED 111 and 112, which are supplied from the R/W channel 121. During the normal write period, therefore, the direction of the current generated by the write current generator 160 varies in accordance with WE) 111 and 112. More specifically, when the +WD 111 is High, the transistor 161 turns on and the transistor 162 turns off. In this instance, a write current flows from left to right within the write head 150, which is shown in FIG. 3. When, on the other hand, the −WD 112 is High, the transistor 161 turns off and the transistor 162 turns on. In this instance, a write current flows from right to left within the write head 150, which is shown in FIG. 3. Therefore, the current is generated by the write current generator 160 so that the direction of the current flowing to the write head 150 varies. The transistors 161 and 162 are current switch circuits for reversing the polarity of the current (the direction of the current) that flows from the current sources 165 and 166 to the write head 150. The following explanation assumes that a negative (−) current flows from left to right within the write head 150 when the transistor 161 turns on with the transistor 162 turning off, and that a positive (+) current flows from right to left within the write head 150 when the transistor 161 turns off with the transistor 162 turning on. The current flowing to the write head 150 is supplied from the current sources 165 and 166 via the switches 163 and 164, which are mounted in the write current generator 160.

Collector terminals of the transistors 161 and 162 are connected to a positive supply voltage +Vcc. Emitter terminals of the transistors 161 and 162 are connected to a negative supply voltage −Vee or ground (GND) via the switch 163 and the current source 165 or via the switch 164 and the current source 166. Therefore, when the switches 163 and 164 turn on, a current flows to the write head 150 via the transistor 161 or transistor 162.

The current source 165 generates and supplies a write current for writing onto the magnetic disk. For the sake of brevity, it is assumed that the write current is 50 mA. When a current of +50 mA or −50 mA flows to the write head 150, data may be written onto the magnetic disk. The current I1 supplied from the current source 165 during the normal write period is a write current and fixed at 50 mA.

On the other hand, the current source 166 generates and supplies an overshoot current. It is assumed that the overshoot current temporarily flows from the current source 166 when the polarity of the current flowing to the write head 150 reverses. The current from the current source 166 is supplied only when the direction of the current flowing to the write head 150 changes. The switch 163 is provided between the current source 165 and the write head 150. The switch 164 is provided between the current source 166 and the write head 150. The switch 163 controls the current supply from the current source 165. The switch 164 controls the current supply from the current source 166.

The switch 163, which is connected to the current source 165, is controlled in accordance with the write control signal 113. In reality, the switch 163 is controlled by a superimposed signal 147, which is obtained when a superimposition circuit 140 superimposes the degauss enable signal 171 over the write control signal 113. This control operation will be described later. During the normal write period, the write control signal 113 is High so that the switch 163 is on. Therefore, the current source 165 constantly supplies a current to the write head 150.

The switch 164, which is connected to the current source 166, is controlled in accordance with an output that is generated from the AND (logical product) circuit 142. When the output from the AND (logical product) circuit 142 goes High, the switch 164 turns on. The write control signal 113 and the output of the single shot (S/S) 141 enter the AND (logical product) circuit 142. The AND (logical product) circuit 142 then ANDs the write control signal 113 and the output of the single shot (S/S) 141.

During the normal write period, the +WD 111 and −WD 112 are input to the single shot (S/S) 141. The single shot (S/S) 141 detects a rise edge in WD 111 and WD 112. In other words, the output of the single shot (S/S) 141 becomes a signal that exhibits a pulse when a change occurs in the direction of the current flowing to the write head 150. The output of the single shot (S/S) 141 gives a timing of a state change of the switch 164. Since the write control signal 113 remains High during the normal write period, the output of the AND (logical product) circuit 142 is the same as that of the single shot (S/S) 141 during the normal write period. During the normal write period, therefore, the switch 164 turns on briefly in synchronism with a rise edge in WD 111 and WD 112. More specifically, the switch 164 remains on for the reversal time when a change occurs in the direction of the current flowing to the write head. This causes a current to flow from the current source 166 to the write head 150. The current source 166 supplies 20% of the current that is supplied from the current source 165. It means that the current supplied from the current source 166 during the normal write period is 10 mA.

When the current source 166, which turns on during the reversal time only and is used for overshoot current generation, uses an overshoot as described above, it is possible to reduce the rise time (reversal time) that is required for the write current to completely reverse after a write data value change.

The degauss period during which degaussing is performed will now be described. The degauss waveform generator 170 is used to generate a degauss current waveform for degaussing.

The write control signal 113 is input to the degauss waveform generator 170. The degauss waveform generator 170 generates the degauss enable signal 171 in accordance with the write control signal 113. More specifically, the degauss waveform generator 170 outputs the degauss enable signal 171 when the write control signal 113 falls, that is, when a write process is followed by a degaussing operation at the end of the normal write period. The degauss enable signal 171 has a pulse waveform that remains High for a period that corresponds to the degauss period during which degaussing is performed. While the degauss enable signal 171 is High, a degaussing operation is performed. The degaussing operation ends by the time the degauss enable signal 171 goes Low. Since the switches 131 and 132 switch from an (A) contact to a (B) contact at the beginning of the degaussing operation, the signals to be supplied to the transistors 161 and 162 change from WD 111 and WD 112 to degauss write data 172 and 173. The degauss enable signal 171 remains High during a certain period of time after the end of the normal write period, and then goes Low again.

The degauss waveform generator 170 incorporates an oscillator clock or constant frequency generator. The oscillator clock or the like is used to generate degauss write data (DWD) 172 and 173. For example, DWD 172 and 173 may be 50 MHz fixed patterns. Degauss write data 172 is referred to as the +DWD. Degauss write data 173 is referred to as the −DWD. Degauss write data 172 and 173 are referred to as the DWD. As shown in FIG. 4, DWD 172 and 173 are pulse waveforms having a predetermined frequency and a half-cycle (50% duty cycle) pulse width. As indicated in FIG. 4, these pulse waveforms appear during the degauss period only. The +DWD 172 is a reversal of the −DWD 173. More specifically, when the +DWD 172 is High, the degauss write data 173 is Low. When the +DWD 172 is Low, the degauss write data 173 is High. The +DWD and −DWD are half a cycle out of phase and equal in pulse width.

As indicated in FIG. 3, degauss write data (+DWD) 172 is input to a (B) contact of the switch 131, whereas degauss write data 173 is input to a (B) contact of the switch 132. During the degauss period, the switches 131 and 132 have a (B) contact. Therefore, DWD 172 and DWD 173 are input to the base terminals of the transistors 161 and 162 during the degauss period. A change occurs in the direction of the current flowing to the write head 150 in accordance with DWD 172 and DWD 173. More specifically, when the +DWD 172 goes High, the transistor 161 turns on. When the −DWD 173 goes High, the transistor 162 turns on. In this manner, the direction of the current flowing to the write head 150 may be changed during the degauss period. Consequently, the polarity of the current flowing to the write head 150 reverses at fixed time intervals during the degauss period.

The switches 131 and 132 are controlled in accordance with the degauss enable signal 171. When the degauss enable signal 171 goes High, the switches 131 and 132 change from a (A) contact to a (B) contact. While the degauss enable signal 171 is High, the switches 131 and 132 have a (B) contact. When the degauss enable signal 171 goes Low, the switches 131 and 132 revert to an (A) contact. The switches 131 and 132 have an (A) contact during the normal write period during which the write control signal 113 is High. Therefore, the signal input to the base terminals of the transistors 161 and 162 in the write current generator 160 changes depending on whether the normal write period or degauss period prevails.

During the degauss period, the switch 163 is controlled in accordance with the degauss enable signal 171. When the degauss enable signal 171 is High, the switch 163 turns on. Therefore, the switch 163 is on during the degauss period. It means that the current supplied from the current source 165 constantly flows to the write head 150 during the degauss period.

The switch 163 turns on/off in accordance with the write control signal 113 and degauss enable signal 171. More specifically, the state of the switch 163 changes in accordance with the superimposed signal 147, which is obtained when the superimposition circuit 140 superimposes the degauss enable signal 171 over the write control signal 113. The superimposed signal 147 is obtained by extending the write control signal 113 for the degauss period. When the superimposed signal 147 is High, that is, when the write control signal 113 or degauss enable signal 171 is High, the switch 163 is on. The switch 163 remains on during the time interval between the instant at which the normal write period begins and the instant at which the degauss period ends. This ensures that the current supplied from the current source 165 flows to the write head 150 during the normal write period and during the degauss period.

The state of the switch 164 changes in accordance with an output that is generated by the AND (logical product) circuit 142. The write control signal 113 and the output of the single shot (S/S) 141 enter the AND (logical product) circuit 142. Since the write control signal 113 is Low during the degauss period, the output of the AND (logical product) circuit 142 is Low without regard to the output from the single shot (S/S) 141. Therefore, the switch 164 remains off during the degauss period. This ensures that the current flowing from the current source 166 to the write head 150 may be stopped. As described above, the single shot (S/S) 141 to which DWD 172 and DWD 173 are input, the AND (logical product) circuit 142 to which the output of the single shot (S/S) 141 and the write control signal 113 are input, and the switch 164 whose state changes in accordance with the output from the AND (logical product) circuit 142 constitute a control circuit that exercises control to stop the current flow from the current source 166 to the write head 150 during the degauss period.

During the degauss period, the switch 163 remains on as is the case with the normal write period. Since the switch 163 is controlled by the superimposed signal 147, it remains on during the time interval between the beginning of the normal write period and the end of the degauss period. During the degauss period, the switch 164 remains off unlike during the normal write period. The switch 164 is controlled by the output from the AND (logical product) circuit 142. The AND (logical product) circuit 142 ANDs the entered output of the single shot (S/S) 141 and the write control signal 113. The single shot (S/S) 141 detects when normal write data (WD) and degauss write data (DWD) both reverse, and generates a short pulse for specifying a time domain within which the write current reverse time is to be reduced. However, the output from the single shot (S/S) 141 and the write control signal (write gate signal) are simultaneously input to the AND (logical product) circuit 142. Therefore, the output of the AND (logical product) circuit 142 does not go High during the degauss period. Since the switch 164 remains off during the degauss period, the current supplied from the current source 166 does not flow to the write head 150. Therefore, only the current supplied from the current source 165 flows to the write head 150 during the degauss period. It is possible to prevent the overshoot current from flowing to the write head 150 during the degauss period. Therefore, a sharp peak provided by the overshoot current during current direction reversal will not be given to the degauss current waveform prevailing during the degauss period. Consequently, the degauss current naturally attenuates so that the write head is properly degaussed. As described above, the HDD 1 according to the present invention performs degaussing promptly and properly.

The magnitude of the current supplied from the current sources 165 and 166 will now be described. The degauss waveform generator 170 successively reads digital data (DAC value) that is stored in a register within the AE to set a current value for the current source 165 in accordance with the write control signal 113, DWD 172, and DWD 173. This operation will be described later. The digital data (DAC value) 174 is subjected to digital-to-analog conversion and delivered to the current source 165 for the purpose of setting the current for the current source 165. In other words, the current source 165 determines the value of the supply current in accordance with the digital data (DAC value) 174. More specifically, the greater the digital data (DAC value) 174, the larger the current supplied from the current source 165. The current source 165 supplies a necessary write current so that the write head 150 may perform a write during the normal write period. The current source 166, on the other hand, supplies an overshoot current for the purpose of reducing the time required for the write current to rise after current reversal during the normal write period.

The digital data (DAC value) 174 remains unchanged during the normal write period. Therefore, the current source 165 supplies a constant current during the normal write period. During the degauss period, however, the digital data (DAC value) 174 gradually decreases from a level prevailing during the normal write period. In other words, the digital data (DAC value) 174 is maximized during the normal write period, and gradually decreases during the degauss period. Therefore, the current I1 supplied from the current source 165 is maximized during the normal write period, and gradually decreases during the degauss period.

During the degauss period, the current supplied from the current source 166 does not flow to the write head 150. During the normal write period only, the switch 164 turns on at the moment the write current reverses so that the current supplied from the current source 166 flows to the write head 150. Therefore, the current flow to the current source 166 need not be manipulated during the degauss period. Thus, setup should be performed so that the current source 166 supplies only a constant current throughout the degauss period. Further, the switch 164 should be used to exercise control to determine whether or not the current supplied from the current source 166 flows to the write head 150. Even when such setup is performed, the switch 164 remains off during the degauss period. Therefore, the current supplied from the current source 166 does not flow to the write head 150 during the degauss period.

The following explanation assumes that the write current is 50 mA as indicated in FIG. 4. During the normal write period, a peak current of 60 mA (a write current of 50 mA plus an overshoot current of 10 mA) flows to the write head. More specifically, a current of 60 mA is supplied when a change occurs in the polarity (direction) of the current flowing to the write head 150. The subsequent explanation assumes that the current flowing to the write head during the degauss period decreases in steps of 5 mA from 50 mA, which is a write current level. As shown in FIG. 4, the current I1 supplied from the current source 165 during the degauss period gradually decreases in steps of 5 mA from 50 mA (decreases to 45 mA, 40 mA, and so on to 0 mA). Whenever the +DWD 172 or −DWD 173 rises, the digital data (DAC value) 174 for setting a current value for the current source 165 decreases, thereby reducing the current that flows. Current I1 decreases at the same time a pulse appears in the output of the single shot (S/S) 141. When the pulses in the output of the single shot (S/S) 141 are sequentially named 1, 2, 3, and so on from the beginning of the degauss period, the duration of the degauss period is set so that ten pulses appear within the degauss period.

Whenever the +DWD 172 changes from High to Low and from Low to High, current I1 decreases in steps of 5 mA. In other words, current I1 decreases in steps of 5 mA whenever a change occurs in the polarity of the current flowing to the write head 150. Therefore, the current flowing from the current source 165 to the write head 150 attenuates while reversing (decreases from 50 mA to −45 mA, +40 mA, −35 mA, and so on to 0 mA). In other words, the current flowing to the write head converges to approximately zero in accordance with the value of the digital data (DAC value) 174.

In the above instance, the switch 164 is off so that the current I2 supplied from the current source 166 does not flow to the write head 150. Therefore, the total current flowing to the write head 150 attenuates while reversing (decreases from 50 mA to −45 mA, +40 mA, −35 mA, and so on to 0 mA) during the degauss period.

As described above, the present embodiment stops the current flow from the current source 166 to the write head 150 during the degauss period. This makes it possible to prevent the overshoot current from flowing to the write head and the degauss current waveform from being disordered. As a result, degaussing may be performed promptly and properly by an HDD having a simple configuration.

Second Embodiment

Figure 5:
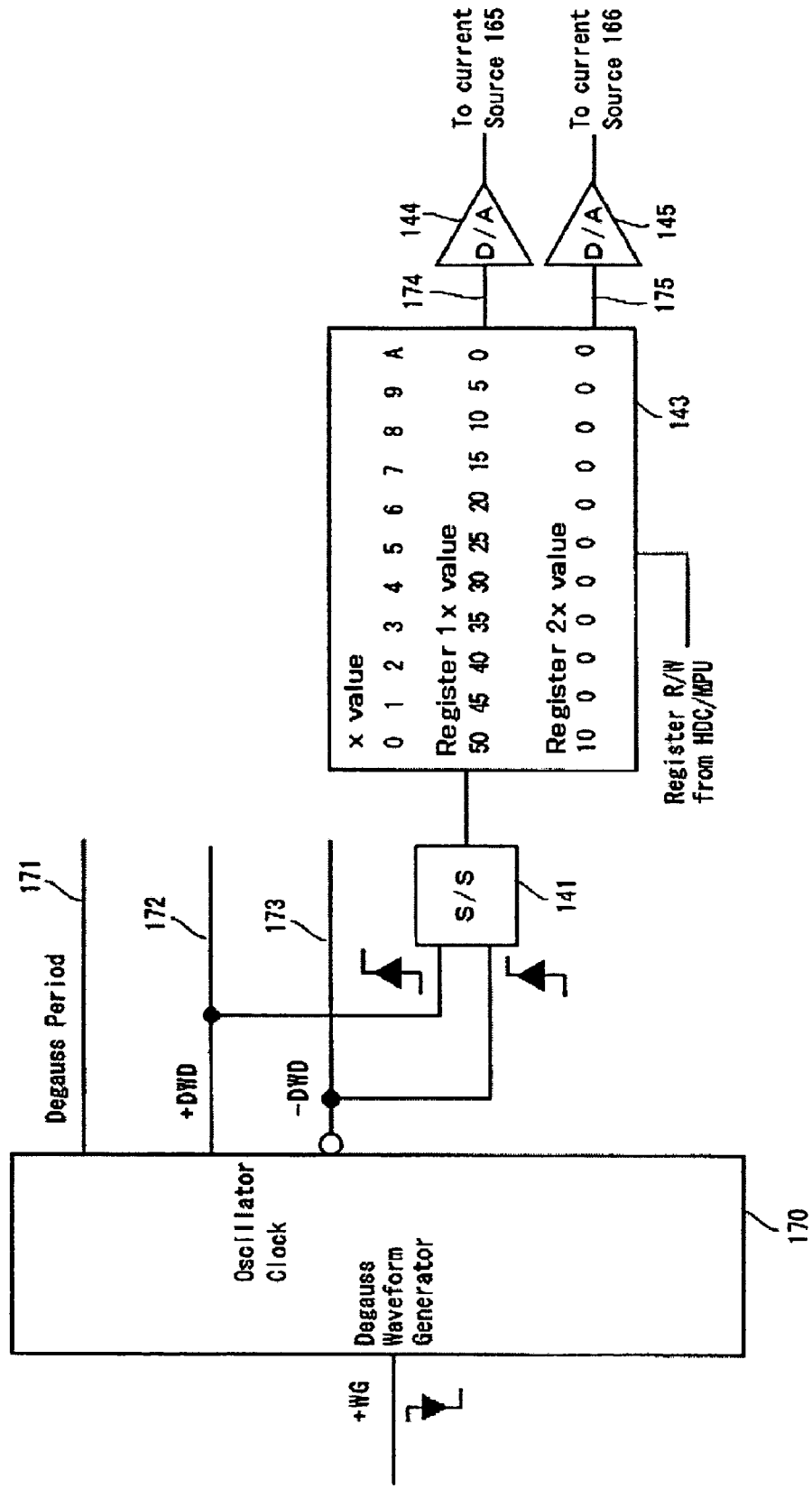
FIG. 5 illustrates the configuration of a part of an AE in an HDD according to one embodiment of the present invention.

An HDD according to a second embodiment will now be described with reference to FIG. 5. FIG. 5 shows the configuration of a part of the AE. The basic configuration of the HDD according to the present embodiment will not be described because it is the same as that of the HDD according to the first embodiment. Further, the control process performed during the normal write period will not be described because it is the same as in the first embodiment. In the first embodiment, the current flowing from the current source 166 to the write head 150 is controlled in accordance with an on/off operation of the switch 164. In the present embodiment, however, the current I2 supplied from the current source 166 is controlled in accordance with a register value that is stored in a register 143 for the AE 13.

In the present embodiment, the output from the single shot (S/S) 141 directly enters the switch 164, which is shown in FIG. 3. This ensures that the switch 164 turns on during the normal write period and during the degauss period when the polarity of the current flowing to the write head reverses. The single shot (S/S) 141 according to the present embodiment detects a rise in DWD 172 and DWD 173, and determines the timing with which the current value settings for the current sources, which are to be gradually decreased, are successively read during the degauss period. In other words, the single shot (S/S) 141 determines the timing with which the digital data (DAC value) stored in the register 143 within the AE is to be successively read. The switches 131 and 132 supply signals to the single shot (S/S) 141 as indicated in FIG. 3. However, such signal supplies are not shown in FIG. 5.

In the present embodiment, the values of the currents supplied from the current sources 165 and 166 are determined by register values stored in the register 143. More specifically, digital data (DAC values) 174 and 175, which are obtained when the register values are read, are subjected to digital-to-analog conversion in DACs 144 and 145. Analog data derived from digital-to-analog conversion are then supplied to the current sources 165 and 166. As a result, the current I1 to be supplied from the current source 165 and the current I2 to be supplied from the current source 166 are determined. The output from DAC 144 is converted to the current flowing to the write head 150 by the current source 165. The output from DAC 145 is converted to the current flowing to the write head 150 by the current source 166. As indicated in FIG. 5, the current value of the current I1 supplied from the current source 165 is determined by register values No. 10 (50) to No. 1A (0), which are stored in the register 143. The current value of the current I2 supplied from the current source 166 is determined by register values No. 20 (10) to No. 2A (0), which are stored in the register 143. The register values are 50 for No. 10, 45 for No. 11, 40 for No. 12, 35 for No. 13, 30 for No. 14, 25 for No. 15, 20 for No. 16, 15 for No. 17, 10 for No. 18, 5 for No. 19, 0 for No. 1A, 10 for No. 20, and 0 for No. 21 to No. 2A. It goes without saying that the other register values are also acceptable. Hexadecimal numbers are used as the register numbers for the register 143.

During the normal write period, register values No. 10 and No. 20 are read. Register value No.10, that is, the register value 50, enters DAC 144. Register value No. 20, that is, the register value 10, enters DAC 145. This ensures that the current source 165 supplies a current of 50 mA with the current source 166 supplying a current of 10 mA during the normal write period. For the sake of brevity, the register values are rendered equal to the supply current values (mA). It goes without saying that the register values may differ from the supply current values (mA). During the normal write period, therefore, a peak current of 60 mA (a write current of 50 mA plus an overshoot current of 10 mA) is supplied when the polarity of the current reverses, and a write current of 50 mA is supplied under the other circumstances.

During the degauss period, register values No. 11 to No. 1A and No. 21 to No. 2A are read. More specifically, register values No. 11 to 1A, that is, the register values 45 to 0, enter DAC 144, and register values No. 21 to 2A, that is, the register values 0, enter DAC 145. The register 143 is set up so that register values No. 11 to 1A are sequentially read in synchronism with the clocks of DWD 172 and DWD 173. Therefore, the current supplied from the current source 165 decreases from 50 mA to 45 mA, 40 mA, 35 mA, and so on to 5 mA. The current decreases to 0 mA at the end of the degauss period.

In the above instance, the overshoot current attenuates within a period shorter than an attenuation period during which the current supplied from the current source 165 attenuates. For explanation purposes, it is assumed that the period during which the current supplied from the current source 165 attenuates is referred to as a first attenuation period, and that the period during which the overshoot current supplied from the current source 166 attenuates is referred to as a second attenuation period. When the second attenuation period is shorter than the first attenuation period, degaussing may be performed promptly and properly. When, for instance, the current supplied from the current source 165 converges to approximately 0 mA at the tenth pulse, the current supplied from the current source 166 should attenuate to achieve convergence at the ninth or preceding pulse. When, for instance, the values 8, 6, 4, 2, and 0 are stored as register values No. 21 to No. 25 with the value 0 stored as register values No. 26 to 2A (not shown in the figure), current I1 converges to approximately zero at the tenth pulse, whereas current I2 converges to approximately zero at the fifth pulse. Consequently, the overshoot current attenuates faster than current I1, which is supplied from a current source. In other words, the attenuation speed for current I2 is higher than that for current I1. As described above, degaussing may also be performed promptly and properly when current I1 and current I2 are attenuated for different periods of time to achieve convergence to approximately 0 mA. Within the degauss period according to the present invention, current I2 attenuates to approximately 0 mA earlier than current I1 does. As a result, degaussing may be performed promptly and properly.

As indicated in FIG. 5, register values No. 21 to No. 2A may be all zeros. Even when register values No. 21 to No. 2A are read in synchronism with the clocks of DWD 172 and DWD 173, the current output from the current source 166 is 0 mA. During the degauss period, therefore, the overshoot current is 0 mA. In this instance, the current flowing to the write head 150 gradually decreases from 50 mA while reversing (decreases to −45 mA, 40 mA, −35 mA, and so on to −5 mA), and converges to 0 mA at the end of the degauss period. Consequently, it is possible to prevent the overshoot current from flowing to the write head and the degauss current waveform from being disordered. As described above, the present embodiment enables an HDD having a simple configuration to perform degaussing promptly and properly.

As described above, the present embodiment includes the register 143 and determines the amount of current in accordance with register values stored in the register 143. Consequently, the present embodiment may provide a constant degauss current waveform and perform a stable degaussing operation. A desired attenuation profile may be selected because the register values may be changed by the HDC/MPU 23. Thus, it is possible to generate a preferred degauss current waveform with ease. In general, however, the register values are often implemented by hardware. The degree of freedom in changing the register values is limited so that only several different attenuation profiles are selectable. Under these circumstances, it is still possible to achieve natural degauss current attenuation by selecting an appropriate attenuation profile from several different ones.

While the present invention has been described in conjunction with the first and second embodiments, the present invention is not limited to these preferred embodiments. Although the preferred embodiments have been described with reference to an HDD, the present invention may be applied to a hard disk drive having a write head that is used to write data onto a magnetic recording medium and in need of degaussing. In such a hard disk drive, the current supplied from the current source 166 should be approximately zero before the end of the degauss period. Although the foregoing preferred embodiments assume that a degaussing process is performed inside the AE 13, the present invention is not limited to such a degaussing process. For example, a circuit for generating the degauss enable signal 171 and the switches 131 and 132, which control the transistors 161 and 162, may be positioned outside the AE. Further, a DWD generation circuit may be included, for instance, in the R/W channel 21. Furthermore, control means for setting a value for the register 143 and a control circuit for controlling the switches 163 and 164 may be positioned outside the AE. The degauss current waveform is not limited to a pulse waveform. Various other waveforms may be used as the degauss current waveform. This degaussing method is ideal for a hard disk drive that employs a perpendicular magnetic recording method.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A hard disk drive, which includes a magnetic recording medium and a write head for writing data onto the magnetic recording medium, wherein the polarity of a current flowing to the write head is reversed in accordance with the data to write the data onto the magnetic recording medium, the hard disk drive comprising:

a first current source configured to supply a first current, which flows to the write head, in order to write the data onto the magnetic recording medium;

a second current source configured to supply a second current, which flows to the write head, when the polarity of the first current changes;

a switching circuit configured to reverse the polarities of currents flowing from the first current source and the second current source to the write head, in accordance with the data; and a control circuit configured to control after the writing data is finished so that the second current becomes approximately zero before the first current converges to approximately zero during a degauss period during which the write head is degaussed by flowing the first current to the write head with the polarity of the first current reversed while the first current is attenuated.

2. The hard disk drive according to claim 1, wherein the control circuit stops the second current during the degauss period.

3. The hard disk drive according to claim 2, wherein the control circuit includes a switch positioned between the write head and the second current source; and wherein the switch stops the second current.

4. The hard disk drive according to claim 3, the control circuit further comprising an AND circuit being input a write control signal for indicating a period for writing the data and the write data for reversing the polarity of a first current, which flows from the first current source; wherein the control circuit controls the switch in accordance with an output from the AND circuit.

5. The hard disk drive according to claim 1, wherein the second current is stopped by reducing the second current output from the second current source to approximately zero.

6. The hard disk drive according to claim 5, wherein the control circuit stops the second current by controlling to reduce the second current output from the second current source to approximately zero.

7. The hard disk drive according to claim 1, wherein the control circuit reverses the polarity of the second current while attenuating the second current to approximately zero during a second attenuation period, which is shorter than a first attenuation period during which the first current converges to approximately zero.

8. The hard disk drive according to claim 7, further comprising a register for setting a current value for the second current wherein the second current attenuates to approximately zero within the second attenuation period in accordance with a register value stored in the register, during the degauss period.

9. The hard disk drive according to claim 8, wherein the register value is variable.

10. A recording method for a hard disk drive, which includes a magnetic recording medium and a write head for writing data onto the magnetic recording medium, wherein the polarity of a current flowing to the write head is reversed in accordance with the data to write the data onto the magnetic recording medium, the method comprising:
   sending a first current, which is supplied from a first current source, to the write head;
   reversing the polarity of the first current, which flows to the write head, in accordance with the data;
   sending the first current and a second current, which is supplied from a second current source, to the write head, when the polarity of the first current is reversed;
   performing degaussing with the polarity of the first current reversed while attenuating the first current, which flows from the first current source to the write head, after completion of a write onto the magnetic recording medium; and
   reducing the second current to approximately zero before the first current converges to approximately zero within a degauss period during which the degaussing is performed.

11. The recording method according to claim 10, wherein the second current is stopped during the degauss period.

12. The recording method according to claim 11, wherein a current flowing from the second current source to the write head is stopped by turning off a switch that is provided between the second current source and the write head.

13. The recording method according to claim 12, further comprising:
   inputting to an AND circuit a write control signal for indicating a period for writing the data and the write data for reversing the polarity of a first current, which flows from the first current source; and
   controlling the switch in accordance with an output from the AND circuit.

14. The recording method according to claim 10, wherein the polarity of the second current is reversed while attenuating the second current to approximately zero during a second attenuation period, which is shorter than a first attenuation period during which the first current converges to approximately zero.

15. The recording method according to claim 14, wherein the second current attenuates to approximately zero within the second attenuation period in accordance with a register value stored in a register for setting a current value for the second current.

16. The recording method according to claim 15, wherein the register value is variable.

17. The recording method according to claim 10, further comprising stopping the second current by reducing the second current output from the second current source, to approximately zero.

18. A hard disk drive, which includes a magnetic recording medium and a write head for writing data onto the magnetic recording medium, wherein the polarity of a current flowing to the write head is reversed in accordance with the data to write the data onto the magnetic recording medium, comprising:
   a first current source for supplying a first current, which flows to the write head, in order to write the data onto the magnetic recording medium;
   a second current source for supplying a second current, which flows to the write head, when the polarity of the first current changes;
   switching means for reversing the polarities of currents flowing from the first current source and the second current source to the write head, in accordance with the data; and
   control means for controlling after the writing data is finished so that the second current becomes approximately zero before the first current converges to approximately zero during a degauss period during which the write head is degaussed by flowing the first current to the write head with the polarity of the first current reversed while the first current is attenuated.

19. The hard disk drive according to claim 18, wherein the control means stops the second current during the degauss period.

20. The hard disk drive according to claim 18, wherein the control means reverses the polarity of the second current while attenuating the second current to approximately zero during a second attenuation period, which is shorter than a first attenuation period during which the first current converges to approximately zero.

* * * * *